Jan. 30, 1945.　　　　G. A. LYON　　　　2,368,228
WHEEL STRUCTURE
Filed Jan. 21, 1941　　　2 Sheets-Sheet 1
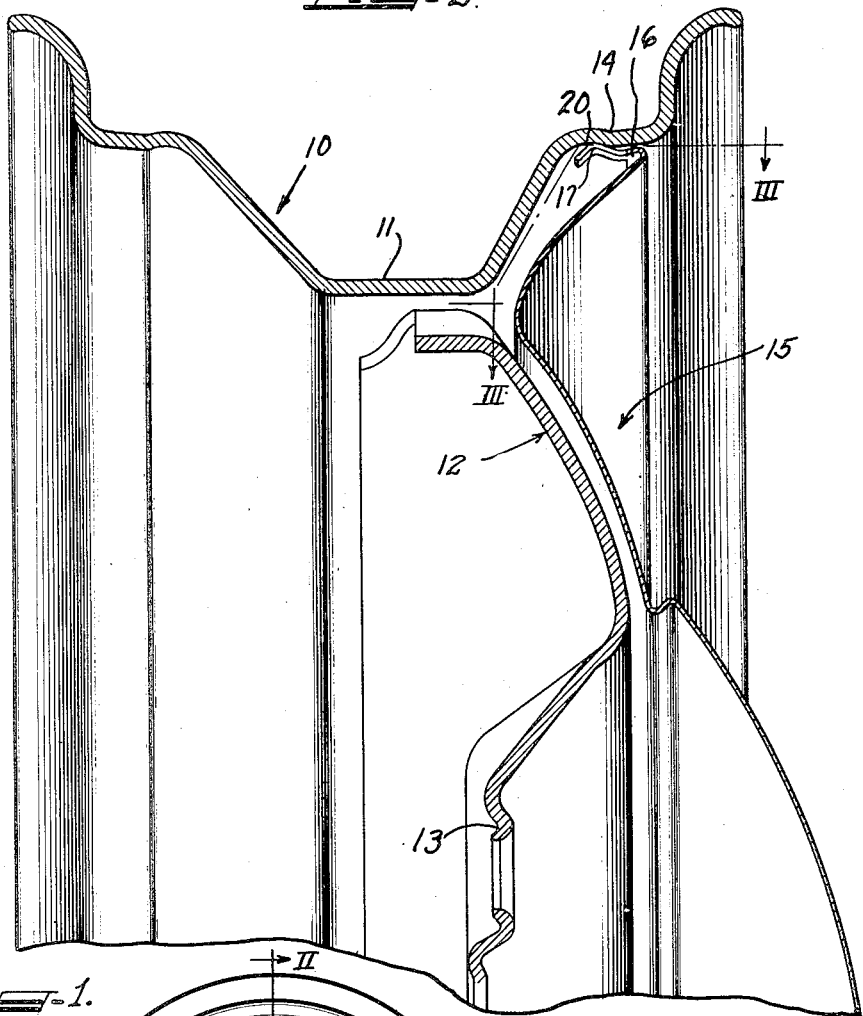
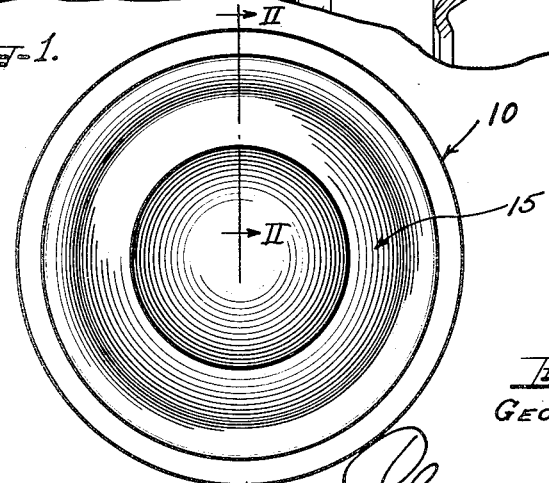
Inventor
GEORGE ALBERT LYON.

Jan. 30, 1945.  G. A. LYON  2,368,228
WHEEL STRUCTURE
Filed Jan. 21, 1941   2 Sheets-Sheet 2
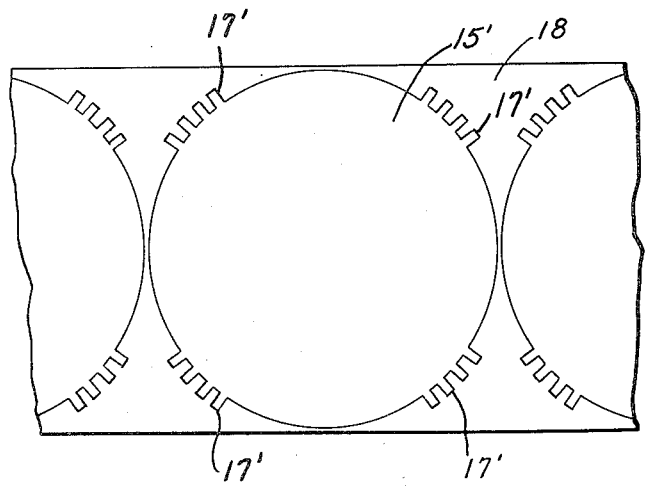
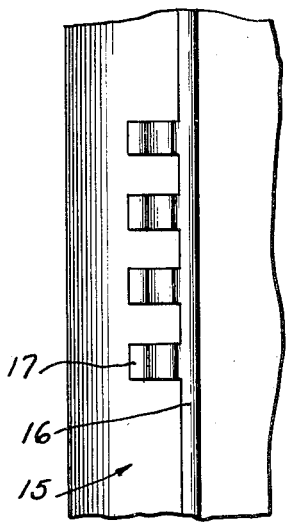
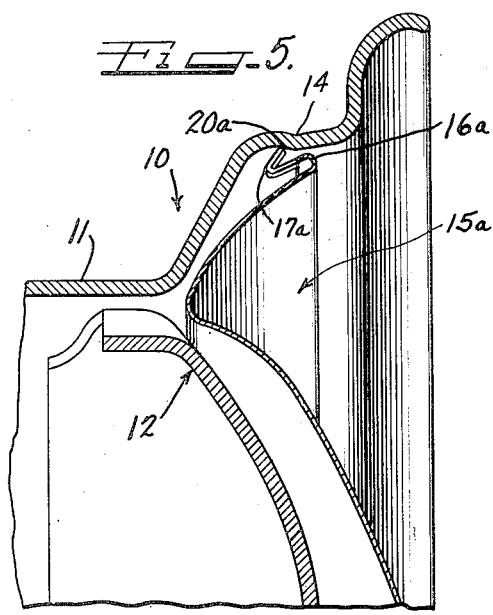
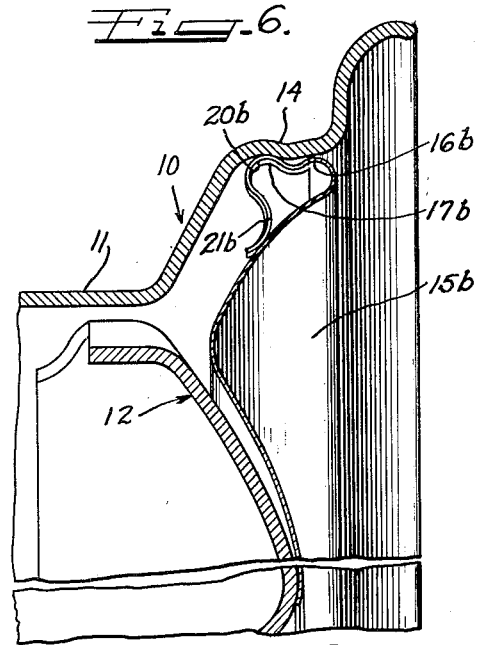
Inventor
GEORGE ALBERT LYON.

Patented Jan. 30, 1945

2,368,228

UNITED STATES PATENT OFFICE 2,368,228

WHEEL STRUCTURE

George Albert Lyon, Allenhurst, N. J.

Application January 21, 1941, Serial No. 375,174

9 Claims. (Cl. 301—37)

This invention relates to a wheel structure, and more particularly to the provision of a wheel structure which can utilize the depressed tire bead retaining portion of the wheel rim part to cooperate in the retention of a wheel cover member on the wheel.

An object of this invention is to provide in a wheel structure a simplified construction for the retention of a snap-on cover member on the wheel.

Another object of this invention is to provide a wheel cover either in the form of a solid disk or an annulus which is self-retained on the wheel solely by reason of flexible fingers on the outer peripheral margin of the cover.

Still another object of this invention is to provide a wheel cover of such construction that the retaining fingers thereof may be blanked from the normally waste corners of the sheet stock from which the cover is punched.

In accordance with the general features of this invention, there is provided in a wheel structure including a body part and a multi-flanged drop center rim part which includes an outer axially extending flange having a hump, a generally circular cover member having a turned outer marginal portion provided at spaced intervals with retaining fingers adapted to be snapped over and past the hump into retaining contact therewith.

Still another feature of the invention relates to the forming of the spaced fingers on the outer periphery of the cover member from the four waste corners of a blank from which the cover member is punched.

Yet another feature of the invention relates to the forming of the retaining fingers on the outer peripheral portion of the cover member of a curved configuration so that they can snugly nest behind the cooperating hump or depressed portion in the flange of the tire rim part.

Other objects and features of this invention will more fully appear from the following detailed description taken in connection with the accompanying drawings which illustrate several embodiments thereof, and in which:

Figure 1 is a side elevation of a wheel structure embodying the features of this invention;

Figure 2 is an enlarged fragmentary vertical cross sectional view taken on substantially the line II—II of Figure 1 looking in the direction indicated by the arrows;

Figure 3 is a fragmentary detailed view taken on the line III—III of Figure 2 looking downwardly, showing in plan the configuration of the fingers on the cover;

Figure 4 is a fragmentary diagrammatic view illustrating how the wheel covers of my invention may be blanked from metallic sheet stock;

Figure 5 is a fragmentary sectional view corresponding to the upper right hand portion of Figure 2 but illustrating a modified form of finger for holding the cover member on the wheel; and Figure 6 is a fragmentary cross sectional view similar to Figure 5 illustrating still another form of retaining finger on the cover.

As shown on the drawings:

The reference character 10 designates generally a multi-flanged drop center type of tire rim which comprises one part of the automobile wheel. This tire rim part includes a base flange 11 fastened by any suitable means to a central wheel body part or spider 12 which is of concave cross sectional shape and includes the usual central bolt-on flange 13. The tire rim part 10 has one of its axially extending outer flanges provided with a depression which extends radially inwardly and as a consequence provides an annular hump or protuberance 14.

Each rim part is provided with two of these annular depressions, one on each side of the base flange, and spaced apart so as to have seated in them the tire beads of the tire disposed in the rim part. The purpose of these depressions as is now known in the automobile art is to prevent sidewise shifting of the tire bead upon sudden rupture or deflation of the tire.

One of the aims of this invention is to utilize this depressed section or hump 14 as a means for aiding in the retention of a wheel cover member, designated generally by the reference character 15, on the wheel. This wheel cover member 15 may be made in the form of a solid disk or hub cap, as shown in Figure 2, or may be made in the form of an annulus, as shown in the modification illustrated in Figure 6. The cover member, irrespective of which form of finger is used, there being three different forms illustrated in this application, is preferably stamped from relatively thin sheet metal such as stainless steel or the like and, of course, may be suitably ornamented as desired. Such a cover member may, for example, be made from sheet metal having a thickness of .020". In Figure 4, I have illustrated how blanks 15' for the cover members of my invention may be blanked or punched from a common strip or sheet 18. One of the features of the invention relates to the utilization of parts of the waste at the four corners of each blank 15' for the forming means or fingers which are illustrated diagrammatically at 17' in Figure 4.

After the blanks 15' have been punched from the common strip 18, each of the blanks may be further formed and pressed in suitable press equipment until the desired configuration of cover is obtained. It will, of course, be appreciated that irrespective of which form of finger is used the blanking operations are substantially the same, and portions of the waste stock illustrated in Figure 4 diagrammatically may be utilized in each case in the formation of the retaining fingers.

As will be perceived from Figures 2, 5, and 6, the wheel cover member has a cross sectional shape conforming generally to the outer cross sectional configuration of the rim and body parts of the wheel. At its outer peripheral margin, the cover member is provided with an axially inwardly turned marginal portion 16 from which extends a plurality of integral retaining fingers 17. These fingers, as illustrated at 17' in Figure 4, are arranged in four groups corresponding to the four corners of the blank, and each group includes a multiple of the fingers, such, for example, as four.

The fingers 17 are all of identical construction and extend axially rearwardly from the outer turned portion 16 of the cover. Each of the fingers has a slightly hooked free end 20 which is turned radially inwardly as shown in Figure 2. This arrangement enables the fingers to be easily cammed over the hump 14 on the rim part.

It should, of course, be noted that the fingers at their point of contact are resiliently stressed by reason of their having been cammed or deflected over the hump in the act of pressing the cover member home on the wheel. Normally, the fingers are arranged in a common circle having a maximum diameter slightly in excess of the normal diameter of the inner surface of the hump 14 so as to require flexure in order for them to pass over and behind the hump into stressed retaining cooperation therewith.

In Figures 5 and 6, as I have noted before, I have illustrated covers with modified finger structures. Since the wheels shown in these figures are identical to the wheel of Figure 2, I have used the same reference numerals to designate corresponding wheel parts in all three of these views.

In Figure 5, the wheel cover member 15a has a rearwardly turned marginal portion 16a, from which at spaced intervals corresponding to the four corners of the blank groups of fingers 17a extend. These fingers 17a are all identical in construction. Each of them is of substantially a V shape and has the extremity of one of the free legs of the spring formed to contact at 20a the rear side of the hump 14. Normally the extremities or contact points 20a of the spring are arranged in a common circle having a diameter slightly in excess of that of the inner surface of the hump or depression 14. As noted before, this requires the flexing of the fingers in order for them to pass over and behind the hump into cover retaining cooperation therewith, at which time they are under resilient tension.

In Figure 6, the wheel cover member 15b is illustrated as being in the form of an annulus instead of in the form of a solid disk or hub cap. It is provided at its outer periphery with an inturned marginal portion 16b which has extending rearwardly therefrom a plurality of groups of retaining fingers 17b. These fingers are arranged in groups at spaced intervals corresponding to the four corners of the blank, as noted herienbefore. All of the fingers are identical in construction. Each of the fingers is of a gooseneck-like construction and embodies a loop 20b of such a curvature that it can snugly nest against the rim part behind the curved hump 14. The free extremity of each of the fingers is designated by the reference character 21b and extends radially inwardly along the rear surface of the cover member proper.

The looped portions 20b of all of the springs are arranged in a common circle having a maximum diameter which is normally slightly in excess of the diameter of the inner surface of the hump 14 so as to require flexing of the springs in order for them to pass over the hump and into retaining cooperation with the rim part at the rear side of the hump, as illustrated in Figure 6.

In all forms of the invention, the cover member may be easily applied by simply pressing it axially against the wheel until the spring fingers or clips flex over the hump and into retaining cooperation therewith. The cover members, irrespective of the form of springs used, may be pried loose from the wheel by inserting the end of a screwdriver under the outerturned marginal edge and then exerting a manual pry-off force sufficient to eject the cover member from its retaining engagement with the wheel.

I claim as my invention:

1. In a wheel structure, a wheel including a body and a multi-flanged drop center rim part, said rim part including an outer generally axially extending flange having a tire bead receiving depressed section which provides a radially inwardly extending hump, and a circular cover member having its outer peripheral portion provided at spaced intervals with rearwardly extending retaining fingers having contact portions for retaining engagement with the rear side of the hump, said contact portions being normally arranged in a circle of a diameter slightly in excess of that of the inner surface of said hump so as to require flexing of the fingers in order for them to pass over the hump and whereby the fingers are under stress when they are in engagement with the rim part, each of said fingers includling an integral curved extension constructed to snugly fit behind the hump on the rim part and being adapted to be easily cammed over the hump upon axial movement of the cover member.

2. In a wheel structure, a wheel including a body and a multi-flanged drop center rim part, said rim part including an outer generally axially extending flange having a tire bead receiving depressed section which provides a radially inwardly extending hump, and a circular cover member having its outer peripheral portion provided at spaced intervals with rearwardly extending retaining fingers having contact portions for retaining engagement with the rear side of the hump, said contact portions being normally arranged in a circle of a diameter slightly in excess of that of the inner surface of said hump so as to require flexing of the fingers in order for them to pass over the hump and whereby the fingers are under stress when they are in engagement with the rim part, each of said retaining fingers being turned back upon the main body of the cover member and including an intermediate looped portion of a generally U-shaped configuration extending diagonally rearwardly away from the cover member and adapted to nest in a space in the rim part to the rear of the hump.

3. In a wheel structure, a wheel including a body and a multi-flanged drop center rim part, said rim part including an outer axially extending flange provided with a hump and a circular cover member having an inwardly turned marginal portion provided with retaining fingers extending rearwardly therefrom at a plurality of spaced sections corresponding to the four corners of a square, each of the fingers being radially inwardly flexible to pass over the hump to cooperate with the rear side thereof and including a terminal portion constructed and arranged to bear against the inner side of said cover member to back up the inward flexing movement of the fingers.

4. As an article of manufacture, a circular wheel cover member for retaining cooperation with a distortion on a vehicle wheel, said cover having at its outer periphery a plurality of fingers formed to be cammed over and behind the distortion on the wheel, each of the fingers including a radially outwardly curved portion flexible radially inwardly to nest behind the distortion on the wheel and having a terminal portion constructed and arranged to extend radially inwardly to bear against the inner surface of the cover member to back up the inward flexing movement of the fingers.

5. In a circular wheel cover, resilient members including a plurality of resilient fingers disposed in spaced relationship around the periphery thereof said fingers having portions disposed rearwardly of the cover, said portions being constructed and arranged for flexing radially inwardly to engage a wheel and having terminal portions extending from said first named portions to bear against the rear surface of the cover to back up the inward flexing movement of the fingers.

6. In a circular wheel cover, resilient members including a plurality of resilient fingers disposed in spaced relationship around the periphery thereof said fingers having portions disposed rearwardly of the cover, said portions being constructed and arranged for flexing radially inwardly to engage a wheel and having terminal portions extending from said first named portions to bear against the rear surface of the cover, said terminal portions having a curved configuration to initiate flexing thereof in response to the radial, inward flexing of said first named portions.

7. As an article of manufacture, a wheel cover having an inwardly curved section at the outer margin thereof, rearwardly extending, inwardly flexible wheel engaging fingers at the periphery thereof and flexible terminal portions extending from said fingers, said terminal portions being constructed and arranged to bear against the inwardly crowned inner surface of said cover to back up the inward flexing movement of the fingers.

8. As an article of manufacture, a circular wheel cover member for retaining snap-on cooperation with radially inwardly extending hump on the rim part of a wheel, said cover member having a turned outer marginal portion provided with a plurality of spaced rearwardly extending resilient fingers flexible radially inwardly, each of the fingers including a looped portion flexible radially inwardly so as to pass over and behind the hump on the rim part for cover member retaining cooperation with the hump, said looped portion being constructed and arranged to be compressed between the said hump and the inner surface of the cover member when the fingers engage the hump.

9. In an ornamental cover for vehicle wheels, wheel engaging fingers extending rearwardly from the periphery of the cover, said fingers being constructed and arranged to flex inwardly, radially upon engagement with the wheel and terminal portions extending from said fingers to the inner surface of said cover for sliding engagement therewith in response to the inward flexing of the respective finger.

GEORGE ALBERT LYON.